United States Patent [19]

Stevenson

[11] 4,187,946
[45] Feb. 12, 1980

[54] WORM HARVESTER

[76] Inventor: Walter A. Stevenson, R.F.D., Box 41, Oakley, Kans. 67748

[21] Appl. No.: 956,637

[22] Filed: Nov. 1, 1978

[51] Int. Cl.$^2$ .............................................. B07C 5/12
[52] U.S. Cl. .................................... 209/674; 171/63; 171/132; 209/935; 209/241
[58] Field of Search ............... 209/674, 675, 935, 241, 209/240, 242, 310; 171/63–65, 124, 126, 132

[56] References Cited

U.S. PATENT DOCUMENTS

| 2,837,209 | 6/1958 | Forbes | 209/935 X |
| 2,940,240 | 6/1960 | Schaaf et al. | 171/126 X |
| 4,050,518 | 9/1977 | Gilmour | 171/63 X |
| 4,122,001 | 10/1978 | Snyder | 209/675 |

Primary Examiner—Allen N. Knowles
Attorney, Agent, or Firm—Edwin L. Spangler, Jr.

[57] ABSTRACT

This invention relates to a machine for harvesting market-size worms from their bedding that lays in the bottom of a flat-bottomed trough-like bed. The machine is self-propelled and travels lengthwise of the beds riding atop their side walls. A novel digger is provided on the front end of the unit made up of a rotating reel with rake-forming tined shafts, the tines of which remain in parallel relation at all times due to a pair of independently rotating eccentrically positioned hubs that rotate in unison therewith and are operatively connected thereto by a series of parallel links. The digger rakes the bedding along with the worms contained therein back onto a conveyor belt that carries the mixture upwardly and rearwardly and deposits it onto a shaker screen inclined downwardly and rearwardly above the open trough. The lead or forward section of the screen is of fine mesh adapted to separate the market-size worms from the mixture consisting of the bedding and undersize worms thus returning the latter to the bed. The market-size worms continue on to the trailing edge of the screen where a coarsely meshed section drops them through onto a transversely-running conveyor belt that discharges them into a waiting receptacle carried alongside the bed on the moving harvester.

10 Claims, 15 Drawing Figures

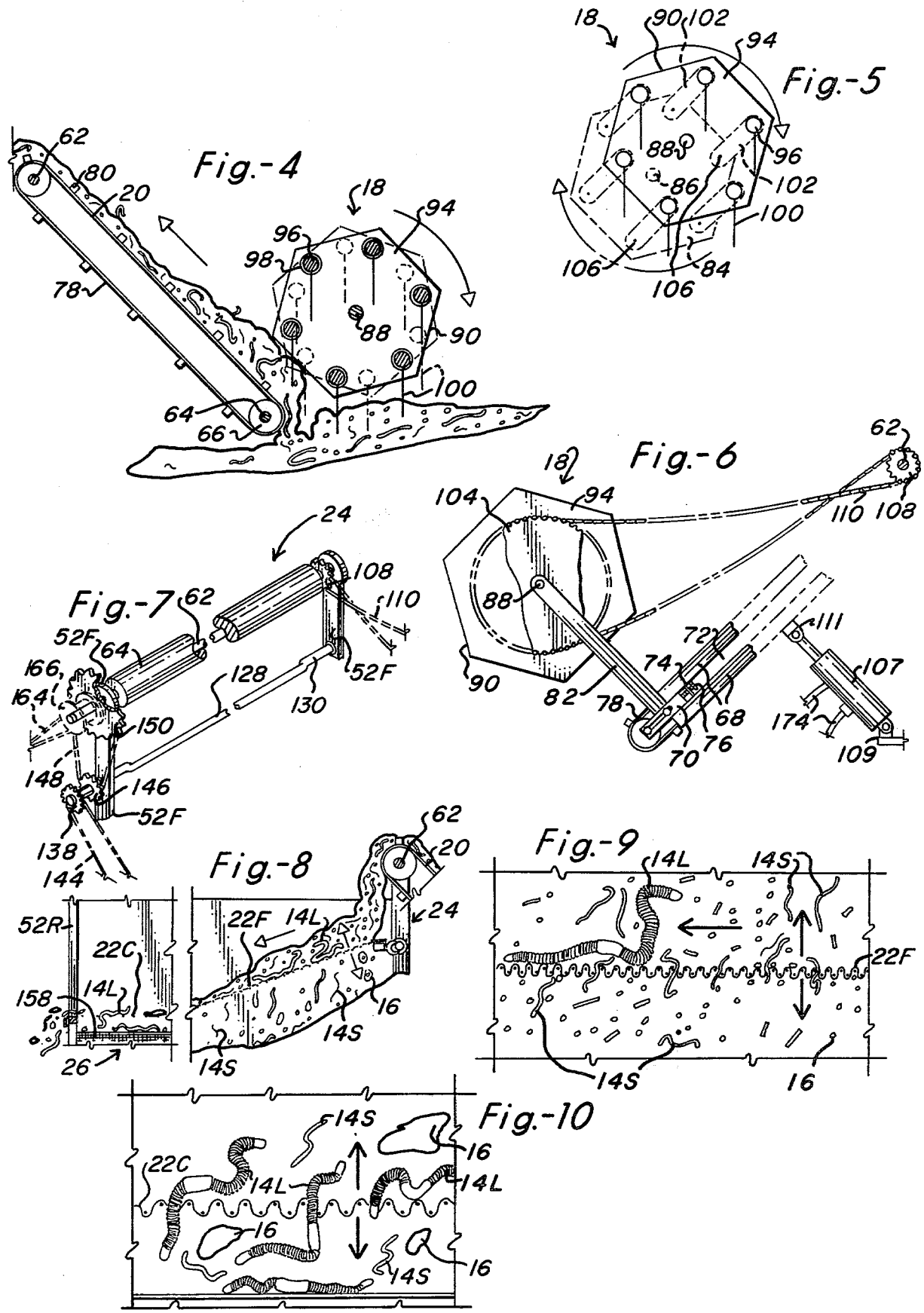

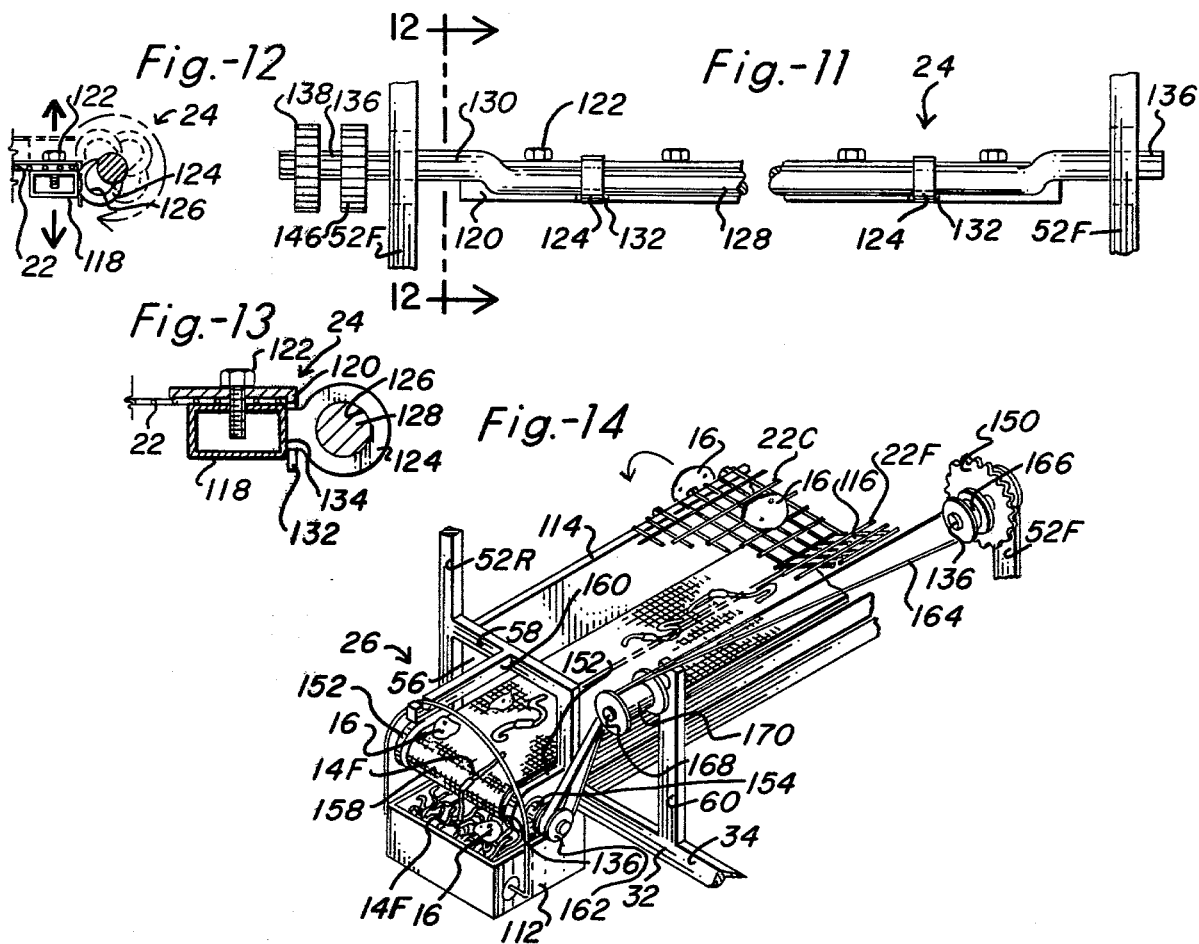
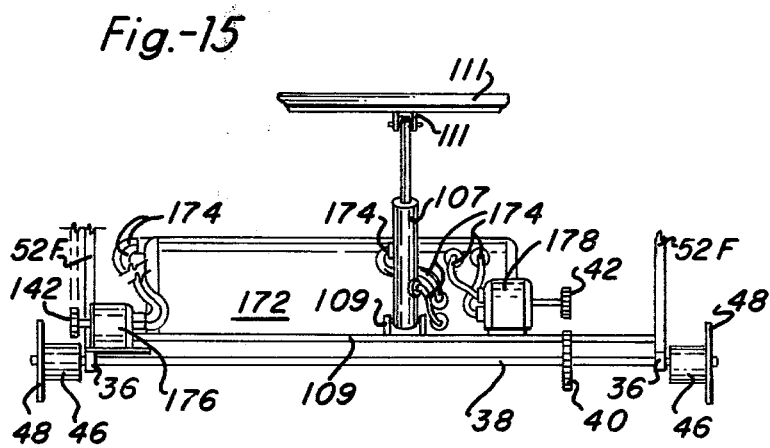

WORM HARVESTER

The lack of available land or the time and inclination to dig one's own fishing worms, or both, have been factors largely responsible for a relatively new industry, specifically, growing fish worms commercially. Actually, with the availability of large numbers of worms on a dependable basis, other uses for them have come to light such as, for example, in treating sewage. Regardless of their end use, the methods of raising and harvesting the worms have, until recently, been almost entirely unmechanized. Lately, however, the cost of labor, the time involved and other expenses have made it more or less essential to develop a more efficient way of handling the product.

By way of background, marketable worms are 2 to 2½ inches long and a six month old worm is generally this size or longer when raised in accordance with modern day accelerated cultivation techniques. For breeding purposes, the worms must be kept slightly longer, generally about sixty days as a minimum for so-called "red wigglers" which are probably the most popular type of commercially grown worm. It is, perhaps, worthy of mention that worms are sold by the pound rather than by the unit, therefore, it behooves a good worm farmer to sort out the undersize worms which weigh next-to-nothing and, in addition, reduce the potential future worm crop if they are sold prematurely.

Before any mechanical harvesting machines were employed, the technique used was to manually lift out a portion of the bedding containing the worms to be sorted, selected and sold; shine a strong light on the bedding to drive the worms to the bottom; carefully sweep or otherwise remove the overlayer of bedding; and hand sort the worms returning the undersized ones along with the bedding back to the flat-bottomed trough-like containers.

As far as prior art patents are concerned, a search has revealed U.S. Pat. Nos. 1,108,882; 1,828,261; 2,523,024; and 3,502,151; none of which is particularly pertinent with the Bartlett patent being the only one of the three that deals with the harvesting of worms but with a totally different structure. Bullard, Jenkins and Stoltenberg all use conveyors to transport harvested materials to a sorting device or other receptacle but, in most other respects, they differ considerably from the harvester of the present invention as will become more apparent as the description thereof proceeds. Of the four, only Jenkins appears to use the concept of a tine-surfaced rotating reel as a digging implement.

By far the most pertinent prior art known to applicant is an earlier stationary version of his mechanical harvester that did not ride along the rails defined by the upstanding trough walls but, instead, stood by itself and the bedding together with the worms contained therein were brought to it for sorting. The mixture was delivered to a box mounted at the head end of a shaker frame. The box had a tilted bottom and a discharge opening at the lower end through which the mixture was discharged onto a moving screen conveyor also mounted on the shaker frame. As the shaker frame was shaken by an eccentric drive, the bedding together with the small worms dropped through the screen and into a stationary hopper preparatory to being collected and returned to the bed while the market worms stayed atop the moving screen conveyor and were collected as they dropped off its discharge end. Unfortunately, the machine did not work well because a substantial number of the small worms, and even some large ones, fell through the upper run of the conveyor only to be caught by and retained upon its lower or return run where they were crushed as the return run passed around the drum at the lead end of the conveyor. While this mechanical harvester constituted a considerable improvement over the strictly manual harvesting techniques, it still required six workers to harvest twenty beds a day.

It has now been found in accordance with the teaching of the instant invention that these and other shortcomings of the prior art mechanized worm harvesters can, in large measure, be overcome by the simple, yet unobvious, expedient of, first of all, mounting the harvester atop the side walls of the trough-like bed and propelling it therealong by means of a suitable drive mechanism as opposed to bringing the bedding and worms imbedded therein to the harvester. A tine-surfaced reel is still used as a digger; however, it swings on the end of a floating boom which automatically allows it to drop down and seek its own depth in the bed. The worms and bedding material lifted on the tines of the digger are deposited on the surface of a belt conveyor and delivered thereby onto a bouncing screen which overlies the bed. The screen is inclined such that the market-size worms gravitate to its lower end where they drop off onto the surface of a transversely-extending conveyor that continuously delivers them over the side to a suitable receptacle carried along by the harvester as it travels the length of the bed. The bedding and undersize worms are returned to the bed where the worms can mature. Such a machine is capable of harvesting twenty beds a day using just two instead of six workers.

It is, therefore, the principal object of the present invention to provide a novel and improved mechanical worm harvester.

A second objective of the within described invention is to provide a worm harvester which is self-propelled along the bed.

Another object is to provide an apparatus for sorting market worms from the bedding in which they are grown that is capable of harvesting the same number of beds during a given time interval with about one-third the personnel.

Still another objective is the provision of a device of the character described which is so designed that the undersize worms drop freely back into the bed with no risk of them being caught on the return run of a screen conveyor and crushed by the drum at the lead end thereof.

An additional objective is to provide a worm harvesting and sorting machine which effectively separates the undersize worms and bedding from the market worms while, at the same time, collecting the latter.

Further objects are to provide a worm harvester which is simple, compact, rugged, relatively small and lightweight, efficient, dependable, easy to operate and trouble free.

Other objects will be in part apparent and in part pointed out specifically hereinafter in connection with the description of the drawings that follows, and in which:

FIG. 4 is a fragmentary elevational view to approximately the same scale as FIG. 3 showing the digger and associated belt conveyor that cooperate to harvest the bed and deliver same to the separator subassembly;

FIG. 5 is a diagram to the same scale as FIG. 4 outlining the manner in which the reel and offset hubs cooperate through the links interconnecting them to maintain the tines parallel upon rotation of the reel;

FIG. 6 is a fragmentary elevational view analogous to FIG. 4 and to the same scale but differing therefrom in showing the chain drive and adjustment features visible on the opposite end of the reel;

FIG. 7 is a fragmentary perspective view to approximately the same scale as FIGS. 2-6 showing the details of the screen shaking mechanism, portions thereof having again been broken away to conserve space;

FIG. 8 is a fragmentary side elevation, portions of which are broken away to conserve space, showing the migration of the mixture of bedding and worms downwardly and rearwardly along the shaker screen;

FIG. 9 is a fragmentary section to a greaty enlarged scale taken along line 9—9 of FIG. 8 showing the sorting of the large market-size worms from the mixture of bedding and undersize worms that takes place upon the fine meshed portion of the screen;

FIG. 10 is a fragmentary section to the same scale as FIG. 9 taken along line 10—10 of FIG. 8 and showing how the market-size worms pass through the coarsely meshed trailing edge of the screen onto the transversely-extending conveyor;

FIG. 11 is an even further enlarged fragmentary detail showing the crank and associated connectors that are used to shake the screen;

FIG. 12 is a section taken along line 12—12 of FIG. 11;

FIG. 13 is a section taken along the arrows shown in FIG. 12 to a still further enlarged scale;

FIG. 14 is a fragmentary perspective to a scale approximating that of FIG. 7 showing the transverse conveyor and drive mechanism therefor; and, FIG. 15 is a rear elevation showing the drive mechanism in more or less a schematic form.

Figure 1:
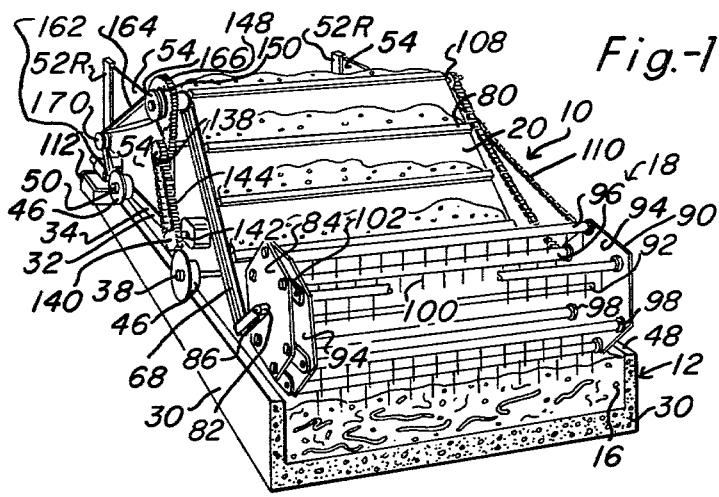
FIG. 1 is a perspective view showing the harvester riding along the side walls of the bed to remove the market-size worms therefrom.
Figure 2:
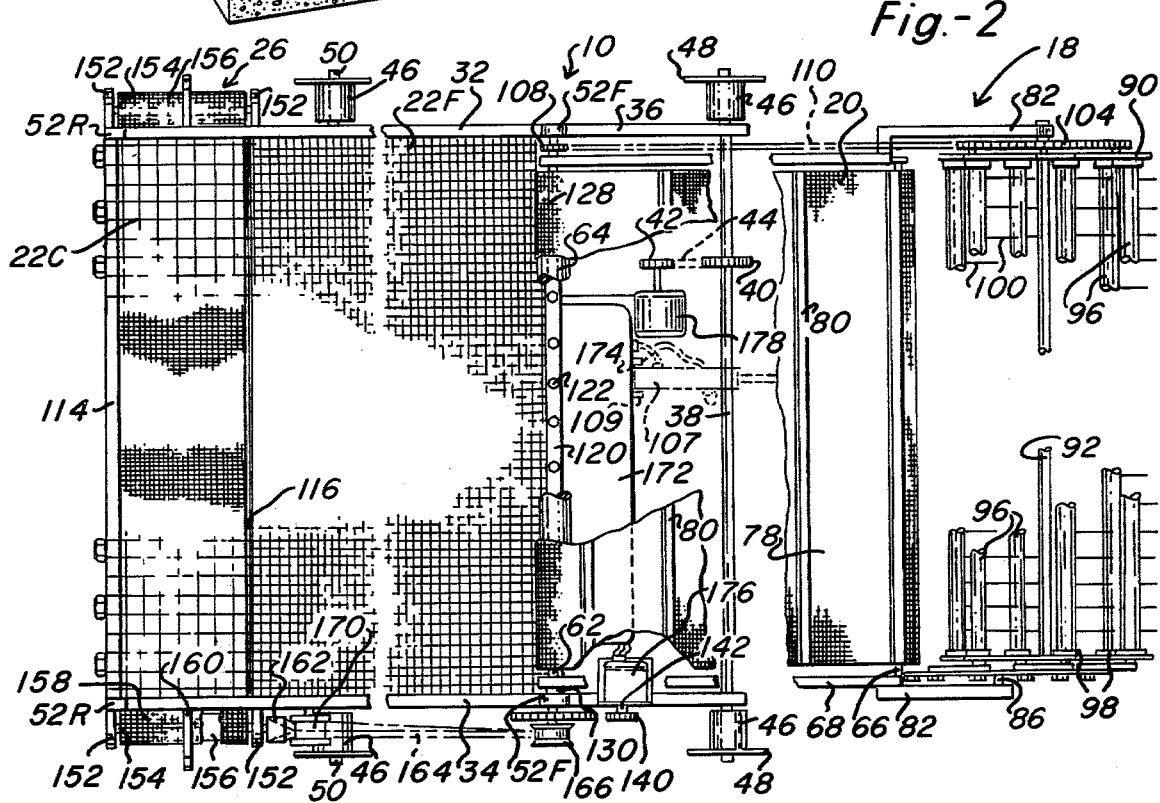
FIG. 2 is a top plan view of the harvester to an enlarged scale with portions thereof broken away to both conserve space and more clearly reveal the interior construction.
Figure 3:
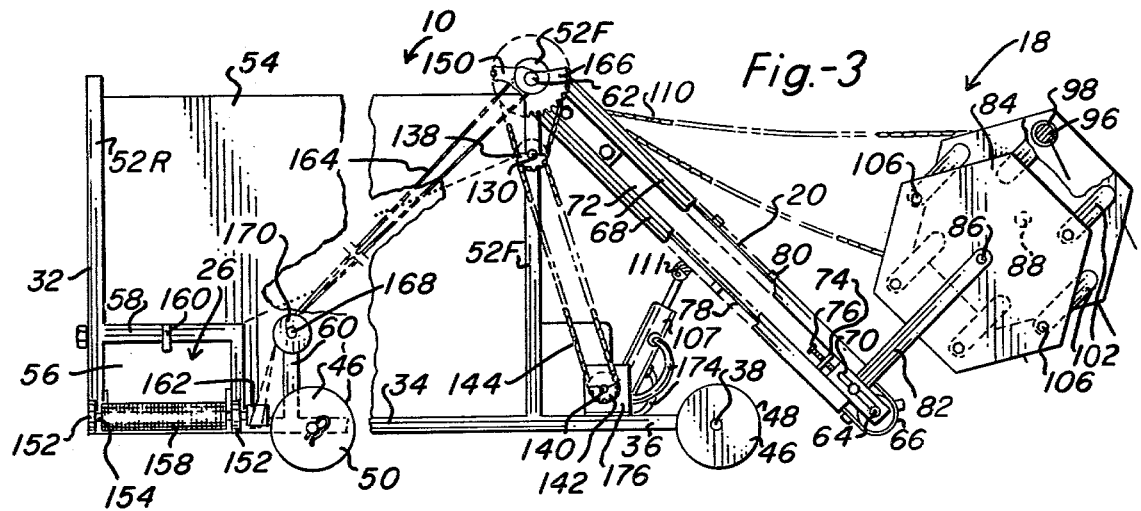
FIG. 3 is a side elevation to the same scale as FIG. 3 and having portions thereof broken away for the same reasons as set forth above.

Referring next to the drawings for a detailed description of the present invention and, initially, to FIGS. 1, 2 and 3 for this purpose, reference numeral 10 has been selected to designate the worm harvester broadly and numeral 12 to similarly designate the flat-bottomed trough-like bed along which it travels while harvesting the worms 14 from the bedding 16 in which they grow and propogate. The front end of the machine has a rotating digger that has been indicated in a general way by numeral 18 and which functions to sweep the mixture of worms and bedding back onto the intake end of an upwardly and rearwardly inclined longitudinally-extending conveyor 20 that deposits the mixture thus harvested onto the leading edge of a shaker screen 22. This screen is divided into a fine mesh section 22F and a coarse mesh section 22C, the respective purposes of which will be set forth in detail presently. A screen-shaking mechanism has been broadly indicated by reference numeral 24 and it is located at the leading edge of the screen to which it is operatively attached. The trailing edge of the screen containing coarsely meshed section 22C overlies a transversely-extending conveyor that has been indicated in a general way by numeral 26 and which extends across the rear end of the unit. A single hydraulic motor 28 operating through a system of shafts, sprockets, chains, belts, pulleys and speed reducers performs the combined functions of propelling the machine along the side walls 30 of the bed, operating both conveyors, rotating the digger and shaking the screen, all of which will be set forth and explained in detail as the description progresses.

Before providing with a detailed look at the various functional subassemblies of the unit it would, perhaps, be wise to consider some of the other aspects thereof such as, for example, the carriage 32 for which purpose continued reference will be made to FIGS. 1, 2 and 3. The bottom of the carriage consists, in the particular form shown, of a generally rectangular bedframe 34 with a pair of integrally-formed forwardly-extending tongues 36 between the free ends of which extends driven shaft 38. This shaft has a sprocket 40 affixed thereto that is, in turn, operatively connected to a drive sprocket 42 through a chain 44, all of which can be seen most clearly in FIG. 2. The extremities of shaft 38 mount flanged carriage drive wheels 46 that ride along the top edge 48 (FIG. 1) of the side walls 30 of the bed 12. The flanges 48 on these wheels engage the outside of the side walls and maintain the carriage in proper longitudinal alignment with the bed. A like pair of flanged wheels turn freely on the projecting ends of shaft 48 that extends across the bedframe in spaced relation behind shaft 38 in parallel relation to the latter.

The corners of the rectangular bedframe each contain upright posts 52F and 52R. Side panels 54 bridge the space between each pair of front and rear posts and serve to contain the mixture of bedding and worms as it migrates toward the discharge end of the shaker screen. These side panels 54 are each notched in their lower rear corners to define rectangular passageways 56 through which the transversely-extending conveyor 26 emerges. A right angled portion 58 of the carriage frames this passageway 56 as is most clearly revealed in FIGS. 3 and 14. The location and function of other elements of the carriage such as uprights 60 will be left until later.

Directing attention next to FIGS. 1-8, the details of both the digger 18 and conveyor 20 will be set forth; however, to do so it will be best to first describe the conveyor since these subassemblies share a common frame. Journalled for rotation at the upper ends of the front pair of posts 52F is a transverse shaft 62 upon which is mounted a cylindrical roller 64 that rotates therewith. This shaft and associated roller are located at the upper or drive end of conveyor 20 while a driven shaft 64 and its roller 66 are at the lower end. A pair of downwardly and forwardly-extending longitudinally-slotted arms 68 arranged in transversely-spaced parallel relation bridge the gap between shafts 62 and 64 while cooperating therewith to define an elevatable boom movable between the operative position shown in FIG. 1 and the elevated or inoperative position shown in FIG. 3. The transverse axis about which these arms 68 pivot is that which is defined by conveyor drive shaft 62. Driven shaft 64 on the lower end of the boom is journalled for rotation between a pair of slide blocks 70 that are mounted for longitudinal slidable movement within the slot 72 in the arms. A nut 74 welded crosswise of the slot on each side receives an adjustment screw 76 that bears against the adjacent end of the slide block and provides a means for adjusting the tension in endless conveyor belt 78 that is reaved around the drive and driven rollers 64 and 66. In the particular form shown, conveyor belt 78 is provided with transversely-extending slats 80 extending from side to side thereof in longitudinally-spaced relation. These slats function in a manner well known in the art to prevent the worm-bedding mixture being elevated thereby from sliping back down into the trough.

In FIGS. 3 and 6, it will be seen that each slide block 70 mounts a reel-supporting arm 82 for adjustable movement therewith. These arms parallel one another and extend upwardly above the conveying surface of conveyor 20, the particular ones shown extending at right angles thereto. Mounted for rotation on the free ends of these arms 82 are a pair of hexagonal hubs 84, the common axis of rotation 86 thereof passing through their centers. A second parallel but offset axis of rotation 88 is that about which reel 90 rotates on center shaft 92. In the particular arrangement shown, reel axis 88 is displaced beyond the ends of reel-supporting arms 82 but in alignment therewith as shown most clearly in FIG. 3. The ends of shaft 92 in the center of the reel are journalled for rotation within the confines of the hubs, again as is most clearly revealed in FIG. 3 and also in FIG. 5.

The flanges 94 on the ends of the reel are hexagonal also and the same size as hubs 84 although they need not be either the same size or the same shape. Extending transversely from corner to corner of the reel flanges 94 are tine-carrying shafts 96 that are free to rotate within journals 98 provided on the inside faces of the reel flanges. Each such shaft carries a series of tines 100 projecting in rake-like fashion from its surface. All these tooth-forming tines lie in transversely-spaced parallel relation to one another and function upon rotation of the reel when lowered into operative position atop the layer of bedding to rake the latter together with the worms contained therein up onto the intake end of conveyor 20 in the manner most clearly shown in FIG. 4.

Next, with particular reference to the diagram of FIG. 5 together with FIGS. 1, 3 and 4, each tined shaft 96 will be seen to carry for rotation therewith a link 102. These links are provided only on one end of the reel (the right end as illustrated) while the other end (FIG. 6) carries the reel-drive sprocket 104. The end of each link remote from that connected to shaft 96 is pivotally connected as indicated at 106 to a point on the adjacent hub 84 that corresponds to the position of the centerline of the shaft 96 to which it is attached. These links define the operative connection between the hubs 84 and reel 90 that becomes effective upon rotation of the latter to maintain all the tines in precisely the same relationship to one another and to the ground at all times. In the particular form shown in FIG. 1, with the reel lowered into operative position, all the tines remain vertical extending down into the bedding while the reel rotates.

Looking particularly at FIG. 5, as the reel flange 94 turns clockwise, it will pull the hub 84 around clockwise at the same speed. The links 102 that define the operative connection between the hubs 84 and reel 90 will progress through the six phantom line positions in which said links are shown, always remaining parallel to one another. Note that the tines remain hidden inside the reel until the shaft carrying them starts its excursion around the lower third or so of its circular travel, whereupon the tines emerge from behind the reel flanges where they can enter the bed.

In FIGS. 6 and 7 it can be seen that reel drive sprocket 104 on the left end of the reel as the latter would be seen from the rear facing in the direction of harvester travel is connected to another smaller sprocket 108 by means of a figure-8 sprocket chain 110 adapted to reverse the direction of reel rotation in relation to shaft 62 which also drives the conveyor 20. As viewed in FIG. 3, shaft 62 must turn counterclockwise to make the top rim of the conveyor move up and to the left while, at the same time, reel 90 must turn clockwise to rake the bedding onto the intake end of the conveyor.

As revealed most clearly in FIGS. 2, 3 and 6, it can be seen that raising and lowering of the reel-carrying boom between its operative and inoperative positions is accomplished by a simple double-acting by hydraulic ram 107 that is connected between the front crossframe member 109 of the bedframe and a transverse frame element 111 extending between the boom arms 68. Actuation of the ram will, of course, control the depth to which the tines enter the bedding.

Next, looking at FIGS. 8–13, the shaker screen 22 and actuating mechanism 24 therefor will be described. FIG. 8 most clearly shows how conveyor 20 delivers the worm-bedding mixture onto the screen 22. It is received at the top or lead end of the screen where the fine mesh 22F is located. Without going into detail for the present as to how the screen is shaken, its function is to return the small particles of bedding 16 together with the undersize worms 14S to the bed by sifting them through the fine mesh. Actually, the mixture delivered to the screen includes, in addition to the worms and bedding, castings and egg capsules, both of the latter being of a size to pass through the fine mesh. It is the above described condition that is represented in FIG. 9.

The market size worms 14L together with the large particles of bedding, wood chips, sticks and other debris are too large to pass through the fine mesh and they, therefore, gravitate on down to the lower end of the screen where the coarse mesh section 22C is located. As seen in FIG. 10, most of the market size worms 14L along with some of the larger pieces of bedding drop through the coarse section of screen onto transverse conveyor 26 where they are delivered to a suitable receptacle 112 hung on the side of the harvester for movement therewith along the trough in the manner shown most clearly in FIG. 14. While some pieces of bedding end up mixed in with the market worms, they present no problem because they are large enough to be easily picked out by hand. Some undersize worms 14S also manage to travel the length of fine mesh section 22F and end up on the conveyor with the market size worms; however, this is of no great consequence since relatively few worms are involved and the main loss is that they add little to the total weight while, at the same time, are lost to the grower as a future market-size worm.

In addition to the above, some market-size worms, a very few undersize worms and some of the largest pieces of bedding fail to drop through even the coarse screen section. Those that do merely pass over the trailing edge of the screen and return once again to the bed for subsequent harvesting.

As seen in FIGS. 2 and 14, the trailing edge of the screen 22 is folded over cross member 114 of the bedframe and bolted or otherwise fastened thereto. The two sections 22C and 22F of the screen are merely overlapped slightly as indicated at 116 and welded together, the particular method used being, of course, inconsequential.

In FIGS. 2, 11, 12 and 13, it can be seen that the leading edge of the screen is laid atop a hollow rectangular cross member 118 and then pinched between its upper surface and the horizontal flange of a length of angle iron 120 by bolts 122. Here again, the manner chosen for attaching the screen to the shaker mechanism 24 to be described next is of no particular importance.

Looking next particularly at FIGS. 11, 12 and 13, it will be noted that a series of two or more collars 124 are attached at transversely-spaced points along the front face of hollow rectangular crosspiece 118 so as to project forwardly thereof. The circular apertures 126 in these collars journal the eccentric section 128 of crankshaft 130 for rotation therein. Notches 132 in the downturned flange of angle iron 120 receive the shank 134 (FIG. 13) of these collars and cooperate therewith to limit the relative transverse movement of the screen along the crankshaft. Uprights 52F of the carriage journal the ends 136 of the crankshaft, these ends being coaxial but offset a half inch or so from the eccentric center section 128. Uprights 52F are, of course, fixed; therefore, rotation of the crankshaft will cause its eccentric center section 128 to move in a circular path indicated by phantom lines in FIG. 12. As it does so, the effect upon screen 22 will be one analogous to that of shaking a blanket or the like thus causing the mixture resting thereon to bounce up and down as it gravitates from the lead end to the trailing or discharge end.

The drive for crankshaft 130 is a simple one and can best be seen by referring to FIG. 7. Sprocket 138 on the crankshaft is operatively connected to sprocket 140 on the main drive shaft 142 by means of sprocket chain 144. A second sprocket 146 on crankshaft 138 is connected by means of chain 148 to large sprocket 150 on conveyor drive shaft 62, again as is most clearly revealed in FIG. 7. The reel drive mechanism previously described is on the other end of shaft 62.

Reference will next be made to FIGS. 1, 2, 3, 7 and 15 for a description of the transverse conveyor 26 and its drive. Alongside passageways 56 in the lower rear corners of the carriage, longitudinally-spaced tongues 152 project out to the side and journal therebetween shafts 154. These shafts carry rollers 156 around which endless conveyor belt 158 is reaved. Above this belt on frame element 54 is a hook from which to hang receptacle 142.

Shaft 154 on the right side of the carriage mounts pulley 162 which is connected by belt 164 to pulley 166 on shaft 62. Stub post 60 of the carriage mounts shaft 168 on which a third pulley 170 is journalled for rotation between pulleys 162 and 166. The axes of rotation of pulleys 162 and 166 are at right angles to one another, therefore, belt 164 is reaved as shown over pulley 170 to change the direction of its loop as is most clearly revealed in FIG. 14.

Finally, with reference to FIG. 15 of the drawing, brief reference will be made to the drive and the controls therefor. Reference numeral 172 denotes a commercially available hydraulic power unit which incorporates in a single housing an AC motor, a hydraulic pump and a hydraulic fluid reservoir. Fluid under pressure is fed from this main power unit through appropriate hydraulic fluid lines 174 to hydraulic ram 107 previously described and also to a pair of hydraulic motors 176 and 178 of standard design. Motor 176 turns shaft 142 and sprocket 140 that drive the screen-shaking mechanism, the "in-line" or longitudinally-extending conveyor 24, the digger subassembly 18 and even the transverse conveyor 26.

Shaft 38 containing the flanged drive wheels 46 is powered by a separate reversible hydraulic motor 178 connected by hoses 174 to receive fluid under pressure from the main electrically-driven power unit 172. The harvester can, therefore, be driven in either direction although, as a practical matter, when driven in reverse motor 176 is shut off since none of the subassemblies controlled thereby is operative. Ram 107 would be actuated in the reverse mode to lift the reel free of the bed into its inoperative position.

In the interests of simplicity, the controls for the main power unit (an on/off switch and associated wiring), valves to control the quantity of fluid delivered to the motors 176 and 178 as well as ram 107, and directional control valves for the ram and reversible motor, have not been shown since they are conventional and their use falls well within the skill of an ordinary artisan trained in hydraulics. Needless to say, such controls are provided even though they have not been described in detail or even illustrated. Moreover, it should be pointed out that other types of drive mechanisms could be substituted for those shown without materially effecting operation of the unit one way or another.

What is claimed is:

1. Apparatus for harvesting a mixture of worms and bedding from a trough-like bed and separating the large size worms from the mixture thus harvested comprising: an open-bottomed wheeled carriage having a front and a rear end mountable atop the bed for movement therealong; a forwardly-extending boom attached to the front end of the carriage for pivotal movement about a horizontally-disposed transverse axis between an elevated inoperative position and a lowered operative one riding in the bottom of the trough; reel means mounted on the end of the boom remote from the carriage for rotational movement about a horizontally-disposed transverse axis, said reel means having tines projecting therefrom effective upon rotation in a selected direction to rake a worm-bedding mixture laying in the bed rearwardly toward the carriage; first conveyor means carried by the boom positioned and adapted to receive the bedding mixture raked back by the reel means and raise same upwardly and rearwardly to a superimposed position above the front end of the carriage; a downwardly and rearwardly inclined screen extending from the front of the carriage to the rear thereof in position to receive the mixture delivered thereto by the first conveyor; means carried by said carriage and connected to said screen operative upon actuation to vibrate the latter, said screen and vibrator means being effective to return the small worms and small particles of bedding therethrough to the bed therebeneath while retaining the larger worms and bedding particles atop thereof; and second conveyor means on the rear end of the carriage extending transversely thereof in position to receive the worms and bedding retained atop the screen as they gravitate toward the lower end thereof.

2. The worm harvesting apparatus as set forth in claim 1 wherein: the screen has a fine mesh section and a coarse mesh section, the fine mesh section lying forwardly of the coarse mesh section and said coarse mesh section overlying the second conveyor means.

3. The worm harvesting apparatus as set forth in claim 1 wherein: drive means is mounted on the carriage and operatively connected to the wheels thereof for propelling same along the bed.

4. The worm harvesting apparatus as set forth in claim 1 wherein: boom-elevating means is connected between the front end of the carriage and boom operative upon actuation to raise and lower the latter.

5. The worm harvesting apparatus as set forth in claim 1 wherein: the reel means comprises a first transversely-spaced pair of hub-forming plates; a plurality of shafts extending transversely between said plates for independent rotational movement relative thereto and to one another in radially-spaced parallel relation to the axis of reel rotation; said tines projecting from each of said shafts in transversely-spaced relation and cooperating therewith to define circumferentially-spaced rake-like subassemblies; a second transversely-spaced pair of hub-forming plates mounted for rotation about a transverse axis paralleling that of the first pair of said hubs in offset relation thereto; and a plurality of links having one end thereof rigidly connected to one of said tine-carrying shafts and the other end pivotally connected to one of said hubs of the second pair thereof at the point thereon corresponding to the axis of pivotal movement of its shaft on the first pair thereof, said first and second pairs of hubs cooperating with one another and with said links upon rotation of one pair thereof to rotate the other pair in the same direction and at the same speed, and the aforesaid elements further cooperating with one another and with the tine-carrying shafts to maintain said tines at the same inclination relative to the bed throughout their excursion around the reel means.

6. The worm harvesting apparatus as set forth in claim 5 wherein: the tines extend downwardly when the reel means is in its operative position.

7. The worm harvesting apparatus as set forth in claim 5 wherein: the tines remain housed between the first pair of hubs during their excursion over the top of the reel and said tines emerge from said housed position during their excursion under the bottom.

8. The worm harvesting apparatus as set forth in claim 5 wherein: the axes of rotation of the tine-carrying shafts are arranged in substantially equiangularly-spaced relation around the axis of rotation of said first pair of hubs.

9. The worm harvesting apparatus as set forth in claim 5 wherein: the axes of rotation of the tine-carrying shafts each lie in a circle whose center lies on the axis of rotation of the first pair of hubs.

10. The worm harvesting apparatus as set forth in claim 5 wherein: the effective length of the links is equivalent to the distance separating the axes of rotation of the first and second pairs of hubs.

* * * * *